(12) United States Patent
James et al.

(10) Patent No.: US 7,074,115 B2
(45) Date of Patent: Jul. 11, 2006

(54) POLISHING PAD

(75) Inventors: David B. James, Newark, DE (US); Mary Jo Kulp, Newark, DE (US)

(73) Assignee: Rohm and Haas Electronic Materials CMP Holdings, Inc., Wilmington, DE (US)

( * ) Notice: Subject to any disclaimer, the term of this patent is extended or adjusted under 35 U.S.C. 154(b) by 0 days.

(21) Appl. No.: 10/937,914

(22) Filed: Sep. 10, 2004

(65) Prior Publication Data

US 2005/0079806 A1    Apr. 14, 2005

Related U.S. Application Data

(63) Continuation-in-part of application No. 10/682,158, filed on Oct. 9, 2003, now abandoned.

(51) Int. Cl.
*B24B 1/00* (2006.01)

(52) U.S. Cl. .................. 451/41; 451/285; 451/287; 451/526; 451/533

(58) Field of Classification Search ............. 451/41, 451/285, 287, 289, 526, 530, 533
See application file for complete search history.

(56) References Cited

U.S. PATENT DOCUMENTS 6,454,634 B1 * 9/2002 James et al. ............... 451/41
6,477,926 B1 * 11/2002 Swisher et al. ............ 451/526
6,910,951 B1 * 6/2005 Balijepalli et al. .......... 451/41

FOREIGN PATENT DOCUMENTS

| EP | 1 354 913 A1 | 10/2003 |
| EP | 1 522 385 A2 | 4/2005 |
| WO | WO 01/91971 A1 | 12/2001 |
| WO | WO 03/066703 A1 | 8/2003 |

OTHER PUBLICATIONS

Uniroyal Chemical: "Adiprene LF 750D", Product Data, Jul. 1996, XP002325260.

* cited by examiner

*Primary Examiner*—Eileen P. Morgan
(74) *Attorney, Agent, or Firm*—Blake T. Biederman

(57) ABSTRACT

A polishing pad is useful planarizing semiconductor substrates. The polishing pad comprises a polymeric material having a porosity of at least 0.1 volume percent, a KEL energy loss factor at 40° C. and 1 rad/sec of 385 to 750 1/Pa and a modulus E' at 40° C. and 1 rad/sec of 100 to 400 MPa.

30 Claims, No Drawings

POLISHING PAD

This application is a continuation-in-part of application Ser. No. 10/682,158, filed Oct. 9, 2003, now abandoned.

BACKGROUND

This specification relates to polishing pads useful for polishing and planarizing substrates, including patterned wafer substrates associated with the manufacture of semiconductor devices.

The production of semiconductors typically involves several chemical mechanical planarization (CMP) processes. In each CMP process, a polishing pad in combination with a polishing solution, such as an abrasive containing polishing slurry or an abrasive-free reactive liquid, removes excess material in a manner that planarizes or maintains flatness for receipt of a subsequent layer. The stacking of these layers combines in a manner that forms an integrated circuit. The fabrication of these semiconductor devices continues to become more complex, requiring higher operating speeds, lower leakage currents and reduced power consumption. In terms of device architecture, this translates to finer feature geometries and increased metallization levels. These increasingly stringent device design requirements are driving the adoption of copper metallization in conjunction with new dielectric materials having lower dielectric constants. Unfortunately, the diminished physical properties, frequently associated with low k and ultra-low k materials, in combination with the devices' increased complexity have led to greater demands on CMP consumables, such as polishing pads and polishing solutions.

In particular, low k and ultra-low k dielectrics tend to have lower mechanical strength and poorer adhesion in comparison to conventional dielectrics that render planarization more difficult. In addition, as integrated circuits' feature sizes decrease, CMP-induced defectivity, such as, scratching, becomes a greater issue. Furthermore, integrated circuits' decreasing film thicknesses require improvements in defectivity while simultaneously providing acceptable topography to a wafer substrate—these topography requirements demand increasingly stringent planarity, dishing and erosion specifications.

For example, one source of gross defectivity with copper-low k wafers is delamination of low k dielectrics due to their poorer mechanical properties. In order to minimize such defectivity arising from delamination, there is a trend toward "gentler" polishing conditions, including lower polishing head down-force. Closely coupled with this trend is a belief that high friction between the wafer and pad increases defectivity. Unfortunately, it is often observed, however, that reducing friction unacceptably reduces polishing removal rates to commercially unacceptable rates.

Low k copper patterned wafers can show unacceptable levels of defectivity, but good topography with Rodel's IC1000™ series polishing pads. These pads consist of a porous polyurethane matrix with its porosity formed from polymeric microspheres. For example, James et al., in U.S. Pat. No. 6,454,634, disclose a porous polyurethane polishing pad with polymeric microspheres having improved stability, planarization and defectivity.

Unlike microsphere-containing pads, poromeric polishing pads consist of a "soft" resilient polymeric pad having porosity produced through a coagulation process. Although the poromeric pads achieve excellent defectivity, they lack the planarization ability demanded for CMP of low k and ultra-low k wafers. Generally, using a polishing pad giving good planarization sacrifices defectivity performance and using a polishing pad giving low defectivity sacrifices planarization performance. Thus, there is a demand for a polishing pad with an improved combination of properties to yield planarized wafers with low defectivity.

STATEMENT OF INVENTION

The invention provides a polishing pad useful for planarizing semiconductor substrates, the polishing pad comprising a polymeric material having a porosity of at least 0.1 volume percent, a KEL energy loss factor at 40° C. and 1 rad/sec of 385 to 750 1/Pa and a modulus E' at 40° C. and 1 rad/sec of 100 to 400 MPa.

An additional aspect of the invention provides a polishing pad useful for planarizing semiconductor substrates, the polishing pad comprising a polyurethane polymeric material having a porosity of at least 0.1 volume percent, the polyurethane polymeric material being formed from a prepolymer reaction product of toluene diisocyanate and polytetramethylene ether glycol with 4,4'-methylene-bis-o-chloroaniline and the prepolymer reaction product having a 5.5 to 8.6 weight percent NCO and an $NH_2$ to NCO stoichiometric ratio of 80 to 110 percent.

In addition, the invention provides a method of polishing a semiconductor substrate including the step of polishing the semiconductor substrate with a polishing pad useful for planarizing semiconductor substrates, the polishing pad comprising a polymeric material having a porosity of at least 0.1 volume percent, a KEL energy loss factor at 40° C. and 1 rad/sec of 385 to 750 1/Pa and a modulus E' at 40° C. and 1 rad/sec of 100 to 400 MPa.

DETAILED DESCRIPTION

A polishing pad's energy loss factor measured at a low rate (1 rad/sec) has an unexpected effect on the pad's planarization abilities and pad-induced defects produced during polishing. This improved polishing performance facilitates increasing the yield for the manufacture of integrated circuits. For example, the polishing pads are useful for polishing Cu/dielectrics such as, Cu/TEOS and Cu/CDO and planarizing semiconductor substrates containing various materials, such as, aluminum, copper, platinum, nickel, tantalum, titanium, tungsten and their alloys and intermetallics. In particular, these polishing pads facilitate reducing defects for semiconductor wafers containing either copper or tungsten. In addition, these polishing pads are particularly useful for interlayer dielectric (ILD), polysilicon, shallow trench isolation (STI), low k and ultra-low k wafers.

Polymeric polishing pads are viscoelastic materials that exhibit both viscous and elastic behavior in response to an applied deformation. The resulting stress includes two components: i) an elastic stress that is in phase with the strain; and ii) a viscous stress that is in phase with the strain rate, but 90 degrees out of phase with the strain. The elastic stress is a measure of the degree to which a material behaves as an elastic solid; and the viscous stress is a measure of the degree to which the material behaves as an ideal fluid. The elastic and viscous stresses are related to material properties through the ratio of stress to strain (or modulus). Thus, the ratio of elastic stress to strain is the storage (or elastic) modulus and the ratio of the viscous stress to strain is the loss (or viscous) modulus. When testing is done in tension, flex, or compression, E' and E" designate the storage and loss modulus, respectively.

The ratio of the loss modulus to the storage modulus is the tangent of the phase angle shift (δ) between the stress and the strain. Thus, E"/E'=tan δ and is a measure of the damping ability of the material.

Polishing is a dynamic process that usually involves cyclic motion of both the polishing pad and the wafer. Energy is transmitted to the pad during the polishing cycle. A portion of this energy is dissipated inside the pad as heat and the remaining portion of this energy is stored in the pad and is subsequently released as elastic energy during the polishing cycle.

There are several parameters that describe the damping effect of a polishing pad quantitatively. The simplest is tan δ, defined above. However, a better parameter for predicting polishing performance is known as the "Energy Loss Factor". ASTM D4092-90 ("Standard Terminology Relating to Dynamic Mechanical Measurements of Plastics") defines this parameter as the energy per unit volume lost in each deformation cycle. In other words, it is a measure of the area within the stress-strain hysteresis loop.

The Energy Loss Factor (KEL) is a function of both tan δ and the elastic storage modulus (E') and may be defined by the following equation:

$$KEL = \tan \delta * 10^{12} / [E'*(1+\tan \delta^2)]$$

where E' is in Pascals.

Unexpectedly, KEL measured at 40° C., 1 rad/sec and 0.3% strain provides an indication of both planarization and defectivity performance. Typical polymeric polishing pad materials include polycarbonate, polysulphone, nylon, ethylene copolymers, polyethers, polyesters, polyether-polyester copolymers, acrylic polymers, polymethyl methacrylate, polyvinyl chloride, polycarbonate, polyethylene copolymers, polybutadiene, polyethylene imine, polyurethanes, polyether sulfone, polyether imide, polyketones, epoxies, silicones, copolymers thereof and mixtures thereof. Preferably, the polymeric material is a polyurethane; and most preferably it is a cross-linked polyurethane. For purposes of this specification, "polyurethanes" are products derived from difunctional or polyfunctional isocyanates, e.g. polyetherureas, polyisocyanurates, polyurethanes, polyureas, polyurethaneureas, copolymers thereof and mixtures thereof.

An approach for controlling a pad's KEL value is to alter its chemical composition. In addition, the morphology of a polymer intermediate dictates its final properties and thus affects the end-use performance of the polymer in different applications. The manufacturing process affects the polymer morphology and the properties of the ingredients used to prepare the polymer.

Preferably, urethane production involves the preparation of an isocyanate-terminated urethane prepolymer from an organic diisocyanate and either a polyol or a polyol-diol mixture. For example, organic diisocyanates include 2,4-toluene diisocyanate, 2,6-toluene diisocyanate, 4,4'-diphenylmethane diisocyanate, naphthalene-1,5-diisocyanate, tolidine diisocyanate, para-phenylene diisocyanate, xylylene diisocyanate, isophorone diisocyanate and mixtures thereof. Example polyols include polyether polyols, such as, poly(oxytetramethylene)glycol, poly(oxypropylene)glycol and mixtures thereof, polycarbonate polyols, polyester polyols, polycaprolactone polyols and mixtures thereof. Example polyols can be mixed with low molecular weight polyols, including ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol and mixtures thereof.

Typically, the prepolymer reaction product is reacted with an aromatic diamine or polyamine, such as, 4,4'-methylene-bis-o-chloroaniline [MBCA], 4,4'-methylene-bis-(3-chloro-2,6-diethylaniline) [MCDEA]; dimethylthiotoluenediamine; trimethyleneglycol di-p-aminobenzoate; 1,2-bis(2-aminophenylthio)ethane; 4,4'-methylene-bis-aniline; diethyltoluenediamine; 5-tert-butyl-2,4- and 3-tert-butyl-2,6-toluenediamine; 5-tert-amyl-2,4- and 3-tert-amyl-2,6-toluenediamine and chlorotoluenediamine. Optionally, it is possible to manufacture urethane polymers for polishing pads with a single mixing step that avoids the use of prepolymers.

The components of the polymer used to make the polishing pad are preferably chosen so that the resulting pad morphology is stable and easily reproducible. For example, when mixing 4,4'-methylene-bis-o-chloroaniline [MBCA] with diisocyanate to form polyurethane polymers, it is often advantageous to control levels of monoamine, diamine and triamine. Controlling the proportion of mono-, di- and triamines contributes to maintaining the cross-linking within a consistent range. In addition, it is often important to control additives such as anti-oxidizing agents, and impurities such as water for consistent manufacturing. For example, because water reacts with isocyanate to form gaseous carbon dioxide, controlling the water concentration can affect the concentration of carbon dioxide bubbles that form pores in the polymeric matrix.

The polyurethane polymeric material is preferably formed from a prepolymer reaction product of toluene diisocyanate and polytetramethylene ether glycol with 4,4'-methylene-bis-o-chloroaniline. Preferably, the prepolymer reaction product has a 5.5 to 8.6 weight percent NCO and more preferably 6.0 to 8.6 weight percent NCO. Examples of suitable prepolymers within this NCO range include: Airthane™ PET-70D, PHP-70D, PET-60D manufactured by Air Products and Chemicals, Inc. and Adiprene™ LF600D, LF601D and LF700D manufactured by Uniroyal Chemical Products division of the Crompton Corporation. In addition, blends of those listed above or other prepolymer blends could be used to reach appropriate weight percent NCO levels as a result of the blending. In addition, the above-listed prepolymers, such as, LF600D and LF700D, are low-free isocyanate prepolymers that have less than 0.1 wt. % free TDI monomer and facilitate forming polishing pads with excellent polishing characteristics. Furthermore, "conventional" prepolymers that typically have higher levels of reaction (i.e. more than one polyol capped by a diisocyanate on each end) and higher levels of free toluene diisocyanate prepolymer should produce similar results. Most preferably, the prepolymer reaction product has a 6.3 to 8.5 weight percent NCO. In addition, low molecular weight polyol additives, such as, diethylene glycol, butanediol and tripropylene glycol facilitate control of the prepolymer reaction product's weight percent NCO.

In addition to controlling weight percent NCO, the prepolymer reaction product preferably has an $NH_2$ to NCO stoichiometric ratio of 80 to 110 percent; and most preferably, it has an $NH_2$ to NCO stoichiometric ratio of 80 to 100 percent.

The polymeric material's KEL as measured at 40° C. and 1 rad/sec is 385 to 750 1/Pa to increase its ability to planarize and decrease pad-induced defectivity. If KEL values are too low, then the polishing pads may have an increased likelihood to scratch semiconductor substrates. Preferably, KEL measured at 40° C. and 1 rad/sec is 395 to 700 1/Pa for an improved combination of planarization and defectivity performance. Most preferably, the KEL measured at 40° C. and 1 rad/sec is between 405 and 600 1/Pa. For purposes of this specification, all physical property measurements represent bulk values obtained with a Rheometrics RSA II dynamic mechanical analyzer, using Rheometrics software, RSI Orchestrator version 6.5.8 and a spring-loaded dual cantilever fixture with a strain of 0.3%.

In addition, the polymeric material's modulus, as measured with a dynamic mechanical analyzer at 40° C. and 1 rad/sec, contributes to the pad's performance. A polymeric material having a modulus of 100 to 400 MPa provides the polishing pad with sufficient rigidity to polish multiple wafers. Preferably, the polymeric material has a modulus of 120 to 350 MPa and most preferably, between 140 and 300 MPa under these test conditions.

In addition, the pad material's bulk hardness (including porosity) can have an effect upon polishing performance. Most preferably, the pad material has a Shore D hardness of 20 to 60.

The following Table (Table 1) summarizes the physical properties that can achieve the improved polishing performance.

TABLE 1

| Property | Broad | Intermediate | Narrow |
|---|---|---|---|
| KEL at 40° C. and 1 rad/sec (1/Pa) | 385 to 750 | 395 to 700 | 405 to 600 |
| E' at 40° C. and 1 rad/sec (MPa) | 100 to 400 | 120 to 350 | 140 to 300 |

In addition, these polishing pads are porous and contain a porosity of at least 0.1 volume percent. This porosity contributes to the polishing pad's ability to transfer polishing fluids. Preferably, the polishing pad has a porosity of 0.2 to 70 volume percent. Most preferably, the polishing pad has a porosity of 0.25 to 60 volume percent. Preferably the pores or filler particles have a weight average diameter of 5 to 100 µm. Most preferably, the pores or filler particles have a weight average diameter of 10 to 90 µm. Furthermore, a weight average diameter of 10 to 30 µm (most preferably, 15 to 25 µm) can further improve polishing performance. The nominal range of expanded hollow-polymeric microspheres' weight average diameters is typically 10 to 50 µm. Optionally, it is possible to add unexpanded hollow-polymeric microspheres directly into a liquid prepolymer blend. Typically, unexpanded microspheres expand in situ during casting. For example, 6 to 9 µm weight average diameter (unexpanded) will grow to 15 to 25 µm and 10 to 16 µm weight average diameter (unexpanded) will grow to 30 to 50 µm.

It is possible to introduce the porosity by casting hollow microspheres, either pre-expanded or expanded in situ; by using chemical foaming agents; by use of dissolved gases, such as argon, carbon dioxide, helium, nitrogen, and air, or supercritical fluids, such as supercritical carbon dioxide; by sintering polymer particles; by selective dissolution; mechanical aeration, such as stirring; or by using an adhesive to agglomerate polymer particles.

If the polishing pad is a polyurethane material, then the polishing pad preferably has a density of 0.5 to 1.05 g/cm$^3$. Most preferably, polyurethane polishing pads have a density of 0.7 to 0.98 g/cm$^3$. In addition, polyurethane polishing pads preferably contain crosslinks for improved strength and mechanical and thermal stability.

EXAMPLES

The polymeric pad materials were prepared by mixing various amounts of isocynates as urethane prepolymers with 4,4'-methylene-bis-o-chloroaniline [MBCA] at 50° C. for the prepolymer and 116° C. for MBCA). In particular, various toluene diiosocyanate [TDI] with polytetramethylene ether glycol [PTMEG] prepolymers provided polishing pads with different properties. At this temperature, the urethane/polyfunctional amine mixture has a gel time on the order of 4 to 9 minutes after the addition of hollow polymeric microspheres (EXPANCEL® 551DE40d42 manufactured by AkzoNobel) to the mixture. The microspheres had a weight average diameter of 30 to 50 µm, with a range of 5 to 200 µm, and were blended at approximately 3,600 rpm using a high shear mixer to evenly distribute the microspheres in the mixture. The final mixture was transferred to a mold and permitted to gel for about 15 minutes.

The mold was then placed in a curing oven and cured with a cycle as follows: thirty minutes ramped from ambient temperature to a set point of 104° C., fifteen and one half hours at 104° C. and two hours with a set point reduced to 21° C. The molded article was then "skived" into thin sheets and macro-channels or grooves were machined into the surface at room temperature—skiving at higher temperatures may improve surface roughness. As shown in Table 2, samples 1 to 5 represent polishing pads of the invention and samples A to D represent comparative examples.

TABLE 2

| Sample | Additive | Microspheres (wt %) | Porosity* (vol %) | Stoichiometric Ratio NH$_2$:NCO (%) | Density (g/cm3) | Hardness (Shore D) |
|---|---|---|---|---|---|---|
| 1 | Adiprene LF600D | 0.9 | 20 | 95 | 0.96 | 51 |
| 2 | Adiprene LF600D | 1.8 | 30 | 85 | 0.79 | 42 |
| 3 | Adiprene LF700D | 0.9 | 20 | 95 | 0.94 | 57 |
| 4 | Adiprene LF700D | 1.8 | 30 | 95 | 0.78 | 48 |
| 5 | Adiprene LF600/LF950A | 1.8 | 30 | 85 | 0.79 | 45** |
| A | Adiprene LF600D | 0 | 0 | 95 | 1.17 | 60 |
| B | Adiprene LF751D | 0 | 0 | 95 | 1.19 | 58 |

TABLE 2-continued

| Sample | Additive | Microspheres (wt %) | Porosity* (vol %) | Stoichiometric Ratio NH$_2$:NCO (%) | Density (g/cm3) | Hardnes (Shore D) |
|---|---|---|---|---|---|---|
| C | Adiprene LF751D | 0.9 | 20 | 95 | 0.90 | 55 |
| D | Adiprene L325 | 1.6 | 30 | 87 | 0.8 | 57 |

*Calculated from weight percent microspheres added.
**Conditioning pad samples by placing them in 50% relative humidity for three days at 25° C. and stacking three 50 mil (1.3 mm) samples before testing improved the repeatability of the hardness test.
Adiprene is a urethane prepolymer product of Crompton/Uniroyal Chemical.
LF600D is a TDI-PTMEG having an NCO of 7.1 to 7.4 wt %.
LF700D is a TDI-PTMEG having an NCO of 8.1 to 8.4 wt %.
LF751D is a TDI-PTMEG having an NCO of 8.9 to 9.2 wt %.
L325 H$_{12}$MDI/TDI-PTMEG having an NCO of 8.95 to 9.25 wt %.
LF950A is a TDI-PTMEG having an NCO of 5.9 to 6.2 wt. %.
Sample 5 represents an Adiprene LF600D and LF950A mixture blended in a 47:53 ratio by weight, achieving a nominal NCO of 6.67 wt %.

Mechanical testing of the polishing pads of Table 2 produced the physical property results using Rheometrics software, RSI Orchestrator version 6.5.8 (with a rate of 1 rad/s or 10 rad/s) shown in Tables 4 and 5. In addition to physical properties, polishing with the conditions of Table 3 provided defectivity and erosion data for each experimental pad.

Example 1

Table 4 compares modulus and energy loss measured at 40° C. and 10 rad/sec to i) defectivity for a copper sheet wafer and a Cu/Ta/TEOS patterned wafer; and ii) dishing and erosion for the Cu/Ta/TEOS patterned copper measured.

TABLE 3

Applied Materials Mirra ® Polisher

| Wafer = Copper Sheet or Patterned Cu/Ta/TEOS | Platen 1 | Platen 2 | Platen 3 |
|---|---|---|---|
| Pad | IC1010 ™ | IC1010 ™ | Experimental pad |
| Initial pad break-in time, min | 10 | 10 | 10 |
| Slurry | EPL2360 | RLS3126 | CUS1351 |
| Slurry flow rate, ml/min | 150 | 80 | 180 |
| Pad cleaner | 8105 | Electraclean ™ | NA |
| Downforce (kPa) | 27.6 | 20.7 | 20.7 |
| Platen speed (rpm) | 93 | 33 | 120 |
| Carrier speed (rpm) | 21 | 61 | 114 |
| Time, s | 90 | 90 | 90 |
| Conditioner = Kinik | AD3CG-181060 | AD3CG-181060 | AD3CG-181060 |
| Ex situ conditioning downforce, kPa/time, s | 62/9 | 34/15 | 62/12 |

Conditioner 180 μm diamond size, 100 μm diamond protrusion, 600 μm diamond spacing with cubic octahedral diamonds.
EPL2360 and 8105 Eternal Chemical
RLS3126 and CUS1351 Rodel, Inc.
Electraclean ™ by Applied Materials, Inc.

TABLE 4

| Sample | E' 40° C. 10 rad/s 0.2% strain, MPa | KEL @ 40° C. 10 rad/s 0.2% strain | Patterned wafer Avg. 854 Orbot defects (a) | Avg. Cu sheet wafer Orbot defects (a) | Patterned wafer Avg. 100 um line dishing, Å | Patterned wafer Avg. 90% density erosion, Å |
|---|---|---|---|---|---|---|
| 1 | 215 | 452 | 89 | 171 | 377 | 715 |
| 2 | 148 | 584 | 75 | 104 | 380 | 654 |
| 3 | 315 | 350 | 81 | 240 | 399 | 744 |
| 4 | 111 | 848 | 51 | 97 | 295 | 567 |
| A | 338 | 355 | 138 | 1219 | 1146 | 1395 |
| B | 753 | 130 | 139 | 1598 | 618 | 1538 |

TABLE 4-continued

| Sample | E' 40° C. 10 rad/s 0.2% strain, MPa | KEL @ 40° C. 10 rad/s 0.2% strain | Patterned wafer Avg. 854 Orbot defects (a) | Avg. Cu sheet wafer Orbot defects (a) | Patterned wafer Avg. 100 um line dishing, Å | Patterned wafer Avg. 90% density erosion, Å |
|---|---|---|---|---|---|---|
| C | NA | NA | 160 | 1315 | 362 | 741 |
| D | 400 | 220 | 151 | 900 | 249 | 533 |

(a) Orbot ™ WF-720 wafer inspection system)
NA is Not Available

The data of Table 4 do not show any correlation between modulus (E') or energy loss and defectivity or planarization for samples measured at 10 rad/sec.

Example 2

Tables 5A and 5B compare modulus and energy loss measured at 40° C. and 1 rad/sec to i) defectivity for a copper sheet wafer and a Cu/Ta/TEOS patterned wafer; and ii) dishing and erosion for the Cu/Ta/TEOS patterned wafer.

TABLE 5A

| Sample | E' 40° C. 1 rad/s 0.3% strain, MPa | KEL @ 40° C. 1 rad/s 0.3% strain | Patterned wafer Avg. 854 Orbot defects (a) | Avg. Cu sheet wafer Orbot defects (a) | Patterned wafer Avg. dishing of 100 um line, Å | Patterned wafer Avg. Erosion of 90% density feature, Å |
|---|---|---|---|---|---|---|
| 1 | 197 | 480 | 89 | 171 | 377 | 715 |
| 2 | 180 | 428 | 75 | 104 | 380 | 654 |
| 3 | 286 | 428 | 81 | 240 | 399 | 744 |
| 4 | 189 | 520 | 51 | 97 | 295 | 567 |
| A | 316 | 377 | 138 | 1219 | 1146 | 1395 |
| B | 807 | 126 | 139 | 1598 | 618 | 1538 |
| C | 476 | 200 | 160 | 1315 | 362 | 741 |
| D | 320 | 289 | 151 | 900 | 249 | 533 |

(a) Orbot ™ WF-720 wafer inspection system)

TABLE 5B

| Sample | E' 40° C. 1 rad/s 0.3% strain, MPa | KEL @ 40° C. 1 rad/s 0.3% strain | Patterned wafer Avg. 854 Orbot defects (b) | Avg. Cu sheet wafer Orbot scratch defects (b) | Patterned wafer Avg. dishing of 100 um line, Å | Patterned wafer Avg. Erosion of 90% density feature, Å |
|---|---|---|---|---|---|---|
| 2 | 180 | 428 | NA | 192* | NA | NA |
| 2 | 148 | 584 | NA | 176* | NA | NA |
| 2 | 148 | 584 | 877* | 383* | NA | NA |
| 5 | 137 | 413 | NA | 245* | NA | NA |
| 5 | 137 | 413 | NA | 326* | NA | NA |
| D | 400 | 220 | 3034* | 5072* | NA | NA |

(b) Orbot ™ WF-720 wafer inspection system fine tuned for small defects.)
NA is Not Available.
*Measured after polishing as shown in Table 3, except that EPL2362 was used on platen 1 and the wafer inspection system having increased sensitivity, and in the case of the Cu sheet wafers measured with an algorithm developed to identify "scratches".

These data illustrate a strong correlation between KEL and improved patterned wafer defectivity, improved copper sheet defectivity and improved patterned wafer dishing and erosion. Polishing pads 1 to 5 were particularly effective at reducing defects for the Cu/Ta/TEOS patterned wafers and copper sheet wafers. In addition to this decrease in defectivity, these polishing pads also provided good dishing and excellent erosion performance. This dishing and erosion performance illustrated the polishing pads' improved ability to planarize.

Example 3

This Example compares TEOS (silicon dioxide deposited from tetraethylorthosilicate precursors) and tungsten polishing characteristics of polishing pad 2 with comparative polishing pad D—polishing pad D is equivalent to IC1000™ polyurethane polishing pads. This comparison relied upon an IPEC 472 polisher at 5 psi 34.5 kPa), 65 rpm platen speed, 50 rpm carrier speed, for 200 mm TEOS wafers and 200 mm tungsten wafers and introduced MSW1500 alumina particle-containing slurry (Rodel, Inc.) at a rate of 150 ml/minute.

Table 6 compares TEOS and tungsten removal rates.

TABLE 6

| Wafer Material | Sample D Removal Rate (Å/min) | Sample 2 Removal Rate (Å/min) |
| --- | --- | --- |
| Tungsten | 2149 | 1845 |
| TEOS | 207 | 233 |

The data of Table 6 illustrate no significant removal rate decline for sample 2 in comparison to a conventional polyurethane polishing pad of sample D for the conditions tested.

Table 7 below compares TEOS wafer defectivity for sample 2 tested with 20 runs and sample D tested with 6 runs analyzed using an SEMVision™ model G2 defect analyzer from Applied Materials, Inc.

TABLE 7

| Run | Sample 2 Total Defects | Sample D Total Defects |
| --- | --- | --- |
| 1 | 1463 | 12869 |
| 2 | 1623 | 7406 |
| 3 | 375 | 6089 |
| 4 | 704 | 7352 |
| 5 | 382 | 5320 |
| 6 | 1308 | 5848 |
| 7 | 575 | NA |
| 8 | 1583 | NA |
| 9 | 292 | NA |
| 10 | 284 | NA |
| 11 | 1346 | NA |
| 12 | 631 | NA |
| 13 | 327 | NA |
| 14 | 262 | NA |
| 15 | 1047 | NA |
| 16 | 1243 | NA |
| 17 | 526 | NA |
| 18 | 992 | NA |
| 19 | 210 | NA |
| 20 | 339 | NA |

NA is Not Available

The data of Table 7 illustrate that polishing pad 2 provides a significant reduction in TEOS defectivity under the conditions tested in comparison to the conventional polyurethane pad of Sample D—typically, alumina-containing slurries result in high defectivity totals. Furthermore, several of the defects identified after polishing with the sample 2 polishing pad may have resulted from poor incoming wafer quality.

In summary, the polishing pads can have an improved combination of planarization ability and low-pad-induced defectivity. For many applications, these polishing pads have the planarization ability of stiffer polishing pads, such as IC1000™ polishing pads, and the pad-induced defectivity analogous to softer polyurethane polishing pads, such as, Politex™ polishing pads.

The invention claimed is:

1. A polishing pad useful for planarizing semiconductor substrates, the polishing pad comprising a polyurethane polymeric material having a porosity of at least 0.1 volume percent, the polyurethane polymeric material being formed from a prepolymer reaction product of toluene diisocyanate and polytetramethylene ether glycol with 4,4'-methylene-bis-o-chloroaniline and the prepolymer reaction product having a 5.5 to 8.6 weight percent NCO and an $NH_2$ to NCO stoichiometric ratio of 80 to 110 percent.

2. The polishing pad of claim 1 wherein the prepolymer reaction product has a 6.3 to 8.5 weight percent NCO.

3. The polishing pad of claim 1 wherein the polishing pad comprises a polymeric material having a KEL energy loss factor at 40° C. and 1 rad/sec of 385 to 750 1/Pa, a modulus E' at 40° C. and 1 rad/sec of 100 to 400 MPa.

4. The polishing pad of claim 1 wherein the polishing pad comprises a polymeric material having a KEL energy loss factor at 40° C. and 1 rad/sec of 395 to 700 1/Pa, a modulus E' at 40° C. and 1 rad/sec of 120 to 350 MPa.

5. The polishing pad of claim 1 wherein the polishing pad comprises a polymeric material having a KEL energy loss factor at 40° C. and 1 rad/sec of 405 to 600 1/Pa, a modulus E' at 40° C. and 1 rad/sec of 140 to 300 MPa.

6. The polishing pad of claim 1 wherein the an $NH_2$ to NCO stoichiometric ratio of 80 to 100 percent.

7. The polishing pad of claim 1 wherein the polyurethane has a cross-linked structure.

8. The polishing pad of claim 1 wherein the polymeric material is polyurethane and the polymeric material has a density of 0.5 to 1.05 $g/cm^3$.

9. The polishing pad of claim 8 wherein the polishing pad comprises a polymeric material having a KEL energy loss factor at 40° C. and 1 rad/sec of 385 to 750 1/Pa, a modulus E' at 40° C. and 1 rad/sec of 100 to 400 MPa.

10. The polishing pad of claim 8 wherein the polishing pad comprises a polymeric material having a KEL energy loss factor at 40° C. and 1 rad/sec of 395 to 700 1/Pa, a modulus E' at 40° C. and 1 rad/sec of 120 to 350 MPa.

11. The polishing pad of claim 8 wherein the polishing pad comprises a polymeric material having a KEL energy loss factor at 40° C. and 1 rad/sec of 405 to 600 1/Pa, a modulus E' at 40° C. and 1 rad/sec of 140 to 300 MPa.

12. The polishing pad of claim 8 wherein the an $NH_2$ to NCO stoichiometric ratio of 80 to 100 percent.

13. The polishing pad of claim 8 wherein the polyurethane has a cross-linked structure.

14. The polishing pad of claim 8 wherein the polymeric material is polyurethane and the polymeric material has a density of 0.5 to 1.05 $g/cm^3$.

15. A polishing pad useful for planarizing semiconductor substrates, the polishing pad comprising a polyurethane polymeric material having a porosity of at least 0.1 volume percent, the polyurethane polymeric material being formed from a prepolymer reaction product of toluene diisocyanate and polytetramethylene ether glycol with 4,4'-methylene-bis-o-chloroaniline and the prepolymer reaction product having a 6.3 to 8.5 weight percent NCO and an $NH_2$ to NCO stoichiometric ratio of 80 to 110 percent and a Shore D hardness of 20 to 60.

16. A method of polishing a semiconductor substrate including the step of polishing the semiconductor substrate with a polishing pad useful for planarizing semiconductor substrates, the polishing pad comprising a polyurethane polymeric material having a porosity of at least 0.1 volume percent, the polyurethane polymeric material being formed from a prepolymer reaction product of toluene diisocyanate and polytetramethylene ether glycol with 4,4'-methylene-bis-o-chloroaniline and the prepolymer reaction product having a 6.3 to 8.5 weight percent NCO and an $NH_2$ to NCO stoichiometric ratio of 80 to 110 percent and a shore hardness of 20 to 60.

17. The method of claim 16 wherein the prepolymer reaction product has a 6.3 to 8.5 weight percent NCO.

18. The method of claim 16 wherein the polishing pad comprises a polymeric material having a KEL energy loss factor at 40° C. and 1 rad/sec of 385 to 750 1/Pa, a modulus E' at 40° C. and 1 rad/sec of 100 to 400 MPa.

19. The method of claim 16 wherein the polishing pad comprises a polymeric material having a KEL energy loss factor at 40° C. and 1 rad/sec of 395 to 700 1/Pa, a modulus E' at 40° C. and 1 rad/sec of 120 to 350 MPa.

20. The method of claim 16 wherein the polishing pad comprises a polymeric material having a KEL energy loss factor at 40° C. and 1 rad/sec of 405 to 600 1/Pa, a modulus E' at 40° C. and 1 rad/sec of 140 to 300 MPa.

21. The method of claim 16 wherein the an $NH_2$ to NCO stoichiometric ratio of 80 to 100 percent.

22. The method of claim 16 wherein the polyurethane has a cross-linked structure.

23. The method of claim 16 wherein the polymeric material is polyurethane and the polymeric material has a density of 0.5 to 1.05 g/cm$^3$.

24. A method of polishing a semiconductor substrate including the step of polishing the semiconductor substrate with a polishing pad useful for planarizing semiconductor substrates, the polishing pad comprising a polyurethane polymeric material having a porosity of at least 0.1 volume percent, the polyurethane polymeric material being formed from a prepolymer reaction product of toluene diisocyanate and polytetramethylene ether glycol with 4,4'-methylene-bis-o-chloroaniline and the prepolymer reaction product having a 6.3 to 8.5 weight percent NCO and an $NH_2$ to NCO stoichiometric ratio of 80 to 110 percent and a Shore D hardness of 20 to 60.

25. The method of claim 24 wherein the polishing pad comprises a polymeric material having a KEL energy loss factor at 40° C. and 1 rad/sec of 385 to 750 1/Pa, a modulus E' at 40° C. and 1 rad/sec of 100 to 400 MPa.

26. The method of claim 24 wherein the polishing pad comprises a polymeric material having a KEL energy loss factor at 40° C. and 1 rad/sec of 395 to 700 1/Pa, a modulus E' at 40° C. and 1 rad/sec of 120 to 350 MPa.

27. The method of claim 24 wherein the polishing pad comprises a polymeric material having a KEL energy loss factor at 40° C. and 1 rad/sec of 405 to 600 1/Pa, a modulus E' at 40° C. and 1 rad/sec of 140 to 300 MPa.

28. The method of claim 24 wherein the an $NH_2$ to NCO stoichiometric ratio of 80 to 100 percent.

29. The method of claim 24 wherein the polyurethane has a cross-linked structure.

30. The method of claim 24 wherein the polymeric material is polyurethane and the polymeric material has a density of 0.5 to 1.05 g/cm$^3$.

* * * * *